(12) United States Patent
Young

(10) Patent No.: US 8,341,219 B1
(45) Date of Patent: Dec. 25, 2012

(54) SHARING DATA BASED ON TAGGING

(75) Inventor: Barry Young, Aptos, CA (US)

(73) Assignee: Adobe Systems Incorporated, San Jose, CA (US)

(*) Notice: Subject to any disclaimer, the term of this patent is extended or adjusted under 35 U.S.C. 154(b) by 738 days.

(21) Appl. No.: 11/370,603

(22) Filed: Mar. 7, 2006

(51) Int. Cl.
  *G06F 15/16* (2006.01)
(52) U.S. Cl. ........................... 709/204; 709/205
(58) Field of Classification Search ............... 707/3, 6, 707/201; 709/203, 216, 219, 225, 231, 204–206; 725/12, 45, 46; 358/448, 450, 452, 453; 382/118, 190, 224
  See application file for complete search history.

(56) References Cited

U.S. PATENT DOCUMENTS

| | | | |
|---|---|---|---|
| 6,301,607 B2 * | 10/2001 | Barraclough et al. | 709/204 |
| 2002/0055955 A1 * | 5/2002 | Lloyd-Jones et al. | 707/512 |
| 2002/0056119 A1 * | 5/2002 | Moynihan | 725/87 |
| 2002/0103813 A1 * | 8/2002 | Frigon | 707/104.1 |
| 2003/0009527 A1 * | 1/2003 | McIntyre et al. | 709/206 |
| 2003/0033296 A1 * | 2/2003 | Rothmuller et al. | 707/3 |
| 2003/0078968 A1 * | 4/2003 | Needham et al. | 709/204 |
| 2003/0145058 A1 * | 7/2003 | Chan et al. | 709/206 |
| 2003/0158855 A1 * | 8/2003 | Farnham et al. | 707/102 |
| 2003/0179301 A1 * | 9/2003 | Feldis et al. | 348/231.3 |
| 2003/0236831 A1 * | 12/2003 | Ortiz et al. | 709/204 |
| 2004/0003411 A1 * | 1/2004 | Nakai et al. | 725/105 |
| 2004/0070678 A1 * | 4/2004 | Toyama et al. | 348/231.3 |
| 2004/0133588 A1 * | 7/2004 | Kiessig et al. | 707/102 |
| 2004/0174434 A1 * | 9/2004 | Walker et al. | 348/211.3 |
| 2005/0021648 A1 * | 1/2005 | Ogasawara et al. | 709/206 |
| 2005/0097173 A1 * | 5/2005 | Johns et al. | 709/206 |
| 2005/0169558 A1 * | 8/2005 | Dance et al. | 382/305 |
| 2006/0251338 A1 * | 11/2006 | Gokturk et al. | 382/305 |
| 2007/0011186 A1 * | 1/2007 | Horner et al. | 707/102 |
| 2007/0118508 A1 * | 5/2007 | Svendsen | 707/3 |
| 2007/0136244 A1 * | 6/2007 | MacLaurin et al. | 707/3 |
| 2007/0208776 A1 * | 9/2007 | Perry et al. | 707/104.1 |
| 2009/0231441 A1 * | 9/2009 | Walker et al. | 348/207.1 |
| 2011/0231747 A1 * | 9/2011 | Zuckerberg et al. | 715/206 |

OTHER PUBLICATIONS

Apple—iLife—iPhoto—Photocasting. "iPhoto 6 Introducing Photocasting: a whole new way to share." http://www.apple.com/ilife/iphoto/features/photocasting.html.
Riya—Photo Search. "Why is email helpful?" http://www.riya.com/popup_email.html.
Kodak Easyshare CX4230 Digital Camera Manual. "4 Tagging Pictures-Share Mode Tagging Pictures for Emailing." http://www.kodak.com/global/en/service/publications/urg00027toc.jhtml?chapsec=urg00027c4s4&pq-path=1609.

* cited by examiner

*Primary Examiner* — Joshua Joo
(74) *Attorney, Agent, or Firm* — Kilpatrick Townsend & Stockton LLP

(57) ABSTRACT

Sharing data based on tagging is disclosed. Sharing includes associating a tag with a contact, identifying an object to which the tag is assigned, and sending object data associated with the object to the contact. Assigning a tag is disclosed. Assigning includes receiving an object from a contact, identifying a tag associated with the contact, and assigning the tag to the object.

30 Claims, 8 Drawing Sheets

Contact to Tag Mapping

| Contact | Tags |
|---------|------|
| Mom | bob, Family |
| Bob | bob |

202

Tag to Contact Mapping

| Tag | Contact |
|-----|---------|
| bob | Mom, Bob |
| Family | Mom |

SHARING SETTINGS FOR "Mom"

400

402 — Send Photos to:
- ☒ Email: ann@xyz.com
  - Subject: [ ]
  - Message: [ ]
- ☐ Post: 123 Main Street, Anytown, CA 12345
- ☒ Phone: 415-123-4567
- ☐ Other: [ ]

406 — Send Photos Tagged:
- ☐ Fido
- ☐ Hawaii
- ☐ People:
  - ☒ Bob
  - ☐ Mary
- ☒ Family:
  - ☒ Sue
  - ☒ Mom

404 —
- ☐ Send Photos as Attachment
- ☒ Send Link to Photos
  - ☐ Public
  - ☒ Private (Require Login)

408 —
- ☐ Send Other Photos
- ☒ Only send photos not already sent to this contact ( Cancel )   ( OK )

FIG. 4

SHARING DATA BASED ON TAGGING

BACKGROUND OF THE INVENTION

Sharing photos or other objects, such as files or bookmarks, has become increasingly popular as the use of email and the Internet has grown. Some applications associated with objects have the ability to tag objects. For example, a user may tag photos with the tag "mom" so that the user can easily search for photos of his mother by searching for photos tagged "mom". A user may want to share photos of a person with that person. For example, a wedding may include hundreds of guests, and the user may want to email to each guest the particular photos that include that guest. The user typically performs this process by manually searching for and manually selecting the photos to send to each guest. This process is time consuming and inconvenient, especially when a user would like to share photos with numerous people. Thus, a more efficient method of selecting and sharing photos or other objects is desirable.

BRIEF DESCRIPTION OF THE DRAWINGS

Various embodiments of the invention are disclosed in the following detailed description and the accompanying drawings.

FIG. 2 illustrates an example of associations between tags and contacts.

FIG. 4 is a diagram illustrating an embodiment of a sharing settings interface that may be used to associate a tag with a contact.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
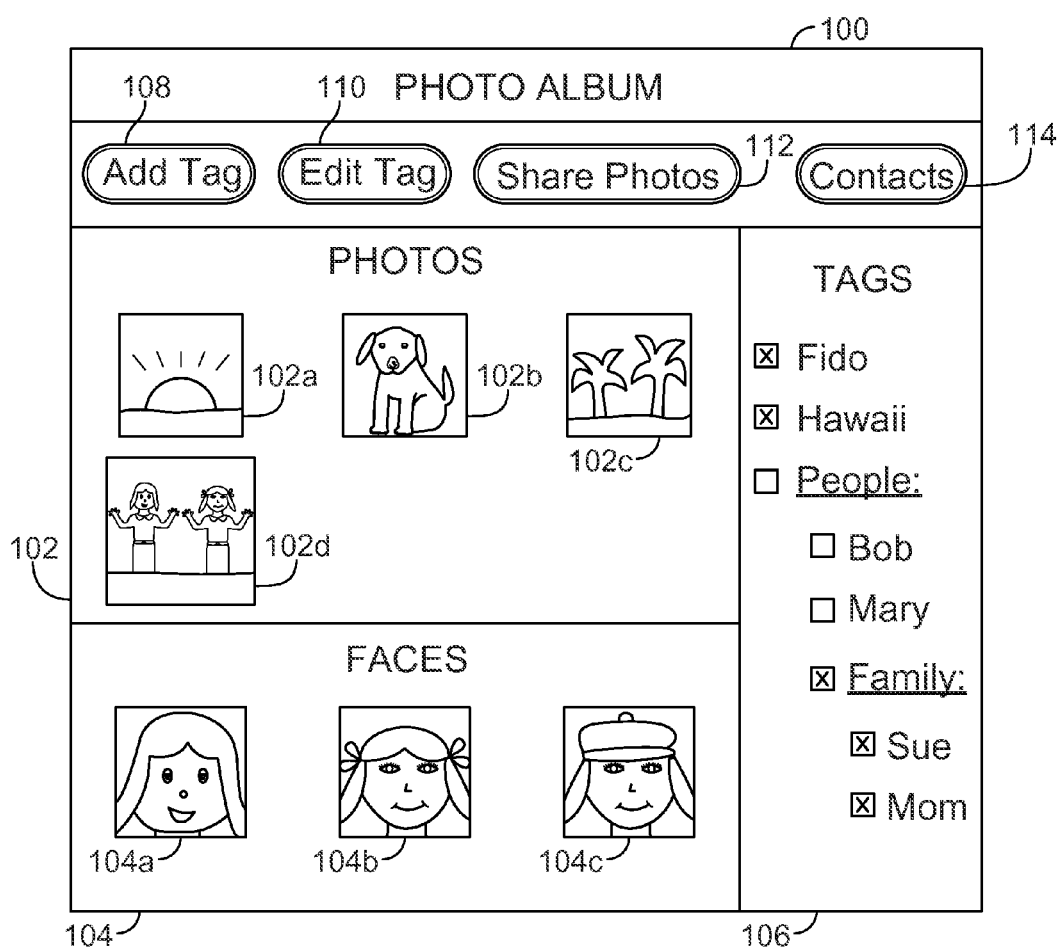
FIG. 1A is a diagram illustrating an embodiment of an interface for viewing objects.

FIG. 1A is a diagram illustrating an embodiment of an interface for viewing objects. In the example shown, interface 100 is used to display images, faces, and tags in panels 102, 104, and 106, respectively. Interface 100 may be associated with an application for storing, managing, manipulating, or organizing information associated with images, faces or tags. Interface 100 in this example is associated with a photo album application.

Panel 102 displays images 102a-102d. Each image may be a file in a variety of formats, including Joint Photographic Experts Group (JPEG), Graphics Interchange Format (GIF), Tagged Image File Format (TIFF), and Portable Network Graphics (PNG). In some embodiments, an image is associated with a photo. For example, an image may be generated by a digital camera or may be a scanned version of a printed photo. In some embodiments, an image is created using a graphics related application, such as Adobe® Illustrator®. Although images or photos may be described in the examples herein, any object, such as a folder, an album (such as a photo album), a file, a reference to an object, a Rich Site Summary (RSS) feed, an object detected from a photo (such as a face), or a subimage (which may include an object detected from an image) may be used in various embodiments. Files may include images, photos, audio, video, or other data. References may include a link or bookmark, such as a Uniform Resource Locator (URL). An object may be a watched object, such as a watched folder or file.

A watched object includes an object that is designated to be monitored for changes to the object. When a change to the object is detected, an action is performed. For example, a watched folder is a folder that has been designated to be monitored for changes to its contents, such as new files, deleted files, or modified files. When a change is detected, an action, such as sending a notification of the change, may be performed.

Figure 1B:
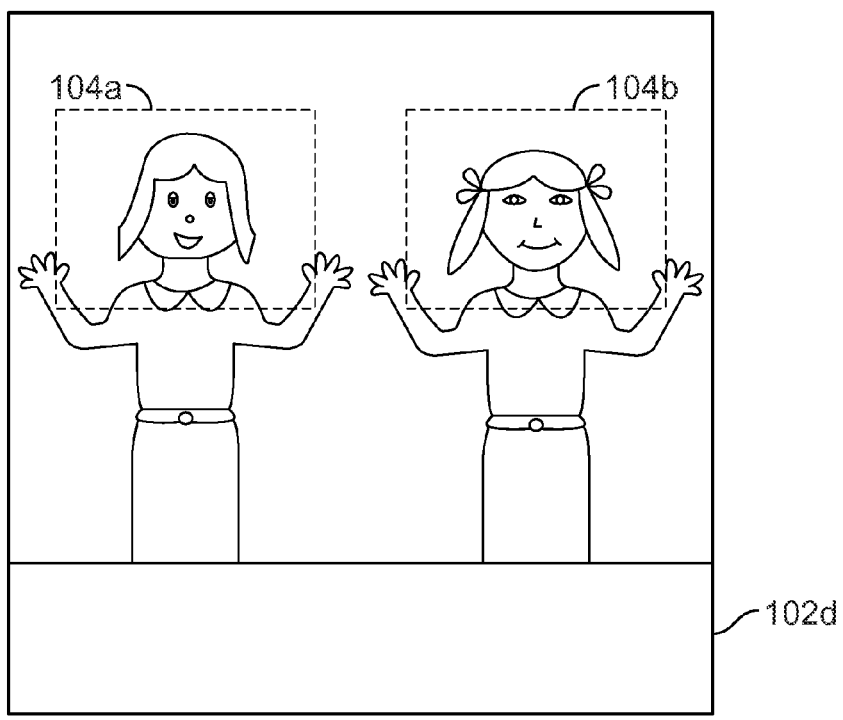
FIG. 1B is an example of an image including faces resulting from a detection process.

Panel 104 displays faces 104a-104c. A face is a subimage that includes an occurrence of a face. Each face is detected from an image. For example, faces 104a-104c may result from a face detection process performed on a set of images. FIG. 1B is an example of an image including faces resulting from a detection process. As shown in this example, detection processing has detected faces 104a and 104b in image 102d. A face may be automatically or manually detected. Automatic detection processing may be performed using various techniques including using Eigenfaces, Adaboost, or neural networks. A two dimensional pattern matching technique may be used. A three dimensional model of the face may be used to approximate the face. Detection may be performed based on the model. Adobe® Photoshop® Elements may be used to perform automatic face detection on photographs. Face detection may be manually performed. A user may examine an image, detect an occurrence of a face, and specify the portion of the image associated with the new face. For example, a user may draw a box around a face to indicate the detection of a face.

Returning to FIG. 1A, side bar 106 lists tags that have been assigned to objects. Tagging refers to the process of assigning a tag to an object, such as an image or a face. A user or an automatic process may assign a tag. A tag is associated with tag data. Tag data may be user specified or machine specified and may include metadata about a tagged object. Examples of tag data include a name, place, event, date, etc. A tag may represent descriptive information associated with an object. For example, a vacation photograph may be tagged with "Boston," "Mom," or "Fourth of July." Tag data may include any type of data, including text, images, audio, or video. Tag data may include free form text or keywords. The same tag may be assigned to more than one object and/or image. An object or image may have multiple tags.

Side bar 106 includes checkboxes for selecting one or more tags. When a tag is selected, photos and faces that have been assigned that tag are displayed. In this example, the tags "Fido," "Hawaii," and "Family" (including "Sue" and "Mom") are selected. Images 102a-102d and faces 104a-104c, which are assigned one or more of these tags, are displayed. Images 102a and 102c are each tagged "Hawaii." Image 102b is tagged "Fido." Image 102d is tagged "Mom" and "Sue." Faces 104a and 104c are tagged "Mom" and face 104b is tagged "Sue".

Tags may be organized hierarchically. For example, tags may be organized into groups and subgroups. Examples of groups include people, places, and events and subgroups for these groups may include family, USA, and sports, respectively. In this example, side bar 106 displays tags hierarchically. "People" is displayed in one line and "Family" is displayed as indented relative to "People." In some embodiments, a tag may be designated as a particular type of tag, such as a person tag. For example, a person tag may be assigned to a face or a photo of a person.

In some embodiments, selecting the tag group "Family" causes the tags in the group "Family" to be selected. As used herein, the term "tag" may refer to a single tag or a tag group, where a tag group includes one or more tags.

Interface 100 includes buttons 108-114. Button 108 may be used to add a new tag. Button 110 may be used to edit an existing tag. Alternatively, a tag may be edited by selecting a tag and selecting an appropriate menu item (e.g., "Edit") from a right click submenu. Editing a tag may include associating a contact with the tag, which is described in further detail below. Button 112 may be used to share one or more photos. In some embodiments, selecting button 112 opens a photo sharing interface, which is described in further detail below. Button 114 may be used to manage contacts. In some embodiments, selecting button 114 opens an interface for managing contacts, including adding, editing, and deleting contacts.

A contact includes any entity that may send or receive data. Examples of contacts include friends, family members, and businesses. A contact is associated with contact information, such as an email address, a postal address, a physical location, a telephone number, a mobile telephone number, an instant messenger ID, a fax number, a URL, or a server.

As used herein, the term "contact" may refer to a contact or contact information. Thus, examples of contacts include: "Bob Smith," "jim@jimsmith.com," "Mom," "415-123-4567," etc. One tag may be associated with an email address of a person and another tag may be associated with a postal address of the same person.

In some embodiments, the interface used varies from that of interface 100. For example, an interface may have no concept of faces, and an interface may not necessarily display objects based on selected tags.

FIG. 2 illustrates an example of associations between tags and contacts. In the example shown, any number of contacts may be associated with any number of tags. Table 202 illustrates mappings from tags to contacts. As shown, contact "Mom" is associated with the tags "Bob" and "Family", where "Family" is a tag group, indicated by the underline. In other words, the contact "Mom" is associated with the tags "Bob," "Sue," and "Mom," since "Sue" and "Mom" are tags within the tag group "Family." Contact "Bob" is associated with the tag "bob." Table 204 illustrates the information in table 202 as mappings from tags to contacts. As shown, tag "bob" is associated with contacts "Mom" and "Bob." Tag "Family" is associated with the contact "Mom." The tag "bob" is associated with two contacts.

The association between a tag and a contact may be stored or organized in various ways in various embodiments. For example, such information may be stored in one or more of a table, a database, file metadata, file, or in any other appropriate data structure. In some embodiments, associations between tags and contacts may be sortable. For example, a single table or other data structure may be used to store the information in tables 202 and 204. In one configuration, entries are organized by contact, as shown in Table 202. In another configuration, entries are organized by tag, as shown in Table 204. It may not be necessary to use multiple data structures if a data structure is sortable. In some embodiments, data is organized in a data structure to enable faster searching. For example, Table 202 or 204 may be sorted alphabetically, by the number of tags or contacts associated with an entry, or by the most recently used tag/contact. In some embodiments, an entry includes a hash to enable faster searching.

The association between a tag and a contact may be used in various ways. For example, a user may want to send wedding photos to his friends. The user may want to send to each friend only photos that include that friend. Each of the photos may be tagged with the names of the guests who appear in that photo. By associating tags with contacts, photos that are tagged may be automatically sent to those contacts. In another example, a user may want to share bookmarks tagged "gardening" with a friend Mary. The user may associate the tag "gardening" with Mary's contact information. Whenever the user tags a bookmark "gardening", the URL associated with that bookmark is sent to Mary. Alternatively, the user may trigger the sending of the bookmark, or it may be sent at other times.

In some embodiments, as previously described, other types of objects may be used, such as folders or files. For example, a folder may be tagged "post," where the tag "post" is associated with the contact "x/users/sue", where x is a URL. When a folder is tagged "post," items in that folder may be uploaded to "x/users/sue" so that a user can share the items in the folder with other users. The items may include files (such as images), folders, or other objects. The items may be uploaded at various times. For example, the item(s) in the folder may be automatically uploaded or uploaded in response to a user indication. In one example, when an item is added to the folder (or another change is made to the folder), the new item may be automatically uploaded. In another example, the user may indicate in an interface that the new items be uploaded when the user is finished adding a group of photos to the folder. In another example, the user may be prompted in response to certain events as to whether to share the item(s) in the folder. For example, in response to adding a file to the folder, a user may be prompted, "A new item was added to this folder. Upload it to the URL associated with this tag? (x/users/sue)"

If the user indicates a positive response, then the new item is uploaded. Exactly which item(s) are uploaded may be specified by the user. For example, new items, modified items, and/or all items may be uploaded.

Sharing may be set up on the sender side and/or receiver side. On the sender side, a user may tag a folder "post," where the tag "post" is associated with a URL associated with a website for sharing photos. Alternatively, the user may tag a folder "bob," where the tag "bob" is associated with an email address or other contact information for Bob. When a new image is added to the folder, the new image is then shared. If the folder is tagged "post," the image is uploaded to the URL. If the folder is tagged "bob," Bob is sent image data (e.g., the image(s) or a link to the images, in which case the images may first be updated to a website associated with the link). On the receiver side, a user may tag a URL, RSS feed, or a networked folder with the tag "keep me updated." When the URL, RSS feed, or networked folder is updated with new images or other data, the user receives the new images via email or other means. As such, the user can be said to subscribe to the URL, RSS feed, or networked folder. In some embodiments, sharing must be set up on both the send and receive side in order for the items to be shared. For example, the sender can send items (or post them to a website), but the receiver will not receive them (or notifications of them) unless the receiver subscribes to them or otherwise indicates that he would like to receive them.

In some embodiments, a contact-object association can be made without using a tag. In one example, metadata associated with a file or a folder may include one or more contacts. A user may drag images into the folder and indicate that the images be shared. The contact is then sent the images or data associated with the images, such as a link to the images (in which case, the images may first be uploaded to a website for sharing images). Similarly, a user may associate the user's contact information with a networked folder or URL, such that whenever the website or folder is updated, the user is notified.

Figure 3:
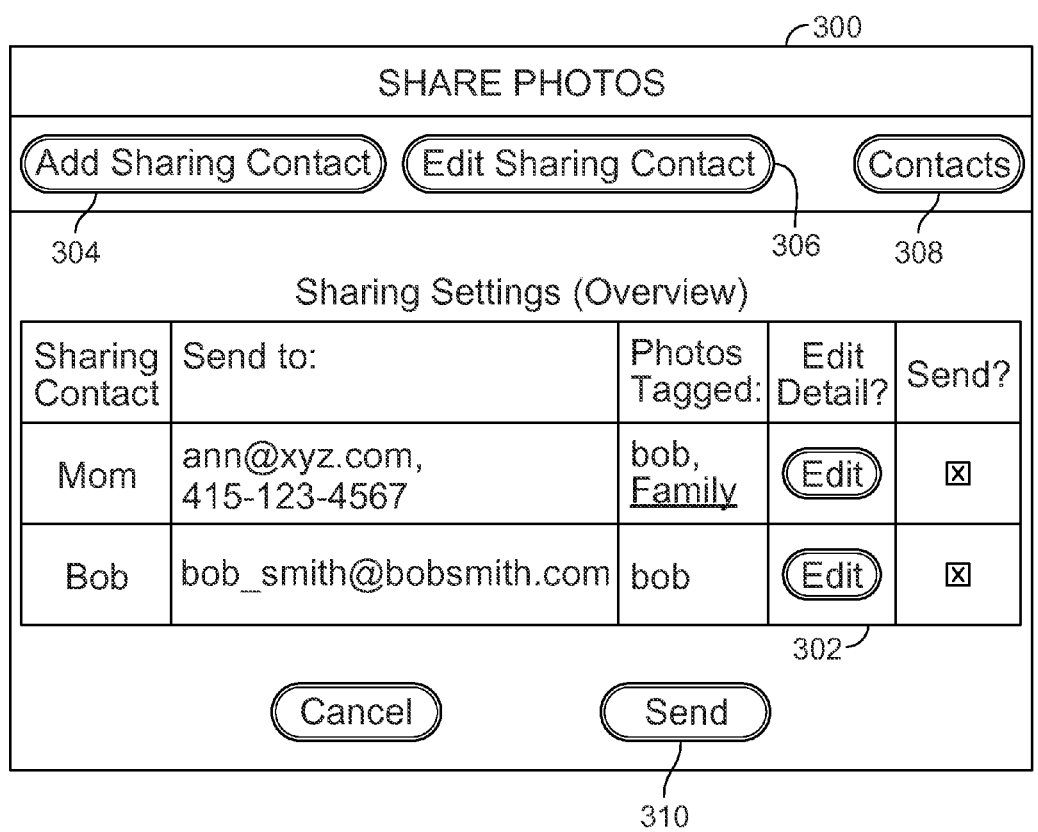
FIG. 3 is a diagram illustrating an embodiment of a photo sharing interface that may be used to share photographs based on associated contacts and tags.

FIG. 3 is a diagram illustrating an embodiment of a photo sharing interface that may be used to share photographs based on associated contacts and tags. In some embodiments, selecting button 112 opens photo sharing interface 300. In the example shown, interface 300 includes sharing settings overview table 302 and buttons 304-310. Table 302 includes columns "sharing contact," "send to," "photos tagged," "edit detail," and "send". An association between one or more contacts and one or more tags is shown in each row in table 202. Specifically, the first row indicates that photos tagged "bob" and "Family" (i.e., tags in the tag group "Family") will be sent to contact "Mom" at her email address (ann@xyz.com) and to her telephone number (415-123-4567). For example, her telephone may be capable of receiving photos, links to photos, or a message indicating that photos are available for viewing at a website. To edit the sharing settings for "Mom", the "Edit" button in the first row may be selected.

Button 304 may be used to add a new sharing contact, which would add another row to table 302. A user may be able to specify sharing contact information, send to information, and tag information. It may not be necessary for all fields to be complete when creating a new sharing contact. A user may fill in the fields she has information for and return later to edit the sharing contact. Button 306 may be used to edit an existing sharing contact, such as "Mom" or "Bob". Button 306 and the "Edit" buttons in table 302 may include some or all of the same functions. Button 306 and/or an edit button associated with a sharing contact may be used to delete a sharing contact. Button 308 may be used to access contact information. For example, the user may have entered contacts into an address book specific to an application such as an image application or an email application. In some embodiments, selecting button 304 opens an interface that obtains information from the address book, giving the user the option of selecting a contact from the address book. In some embodiments, information is obtained directly from a library, address book, file, or database without running or accessing an associated application, such as an email application. Alternatively, the user may manually enter a new sharing contact. In some embodiments, when the user manually enters a new sharing contact, the user is prompted as to whether or not to add the new sharing contact to an address book.

Selecting button 310 causes photo data to be sent according to the sharing settings. The "send" column in table 302 may be used to specify which photos associated with which sharing contacts are to be sent. In some cases, photo data is sent to multiple contacts when button 310 is selected. In some cases, the user may use the "send" column to indicate that photo data should be sent to a subset of the contacts. For example, the user may decide to only share with contact "Mom" at this point in time.

In some embodiments, a preview of the photos to be sent may be presented to the user. A preview may include a snapshot of the photos and contact information. In some cases, photos in a preview may be grouped. For example, one group may have photos for "Mom," and another group may have photos for "Bob." Display of a preview may be triggered by selecting send button 310 or a preview button (not shown). The display window may allow a user to verify that the correct photos are being sent to the correct contacts. If there is a mistake, the user may return to share photos interface 300 to correct the mistake. Otherwise, photos may be sent to the appropriate contacts. In some embodiments, selecting send button 310 or a preview button is not necessary to trigger display of a preview. For example, a preview may be automatically refreshed each time a user updates the send column.

In some embodiments, object data sent to a contact includes tag data. For example, a photo sent to a contact may include the tag. This may enable a contact to use tags that are assigned by a sender. In some embodiments, tag data is not sent to as object data. For example, a tag may include information that a user may want to remain confidential.

Another example of a contact is a photo printing service. For example, a user could associate a tag "print" with a contact "orders@print_your_photos.com". Another example is a website on which a user can post photographs. For example, a user could associate a tag "post" with a contact "x/pictures.html", where x is a URL.

FIG. 4 is a diagram illustrating an embodiment of a sharing settings interface that may be used to associate a tag with a contact. In some embodiments, selecting an "Edit" button in table 302 opens sharing settings interface 400. In the example shown, interface 400 is shown for sharing contact "Mom" in the first row of table 302. Interface 400 is shown to include "send photos to:" panel 402, photo data panel 404, "send photos tagged:" panel 406, and other data panel 408.

Panel 402 indicates the contact information to which photo data will be sent. In some embodiments, the contact information is uploaded from a contact list or address book. The user may then select the appropriate checkboxes to indicate to which contact photo data will be sent. In this example, the photo data will be sent to "ann@xyz.com" (with a blank subject and blank message) and to telephone number 415-123-4567. Table 302 may be automatically updated with the selected contacts, in this example email and phone, when a user selects the "OK" button in interface 400. Other contact information may be entered as well.

Panel 404 indicates the photo data that will be sent. As shown, photos may be sent as an attachment or a link (e.g., a URL). The user can indicate whether the recipient must login (private) to access the photos or whether the photos are public. In various embodiments, the photos may be sent in various other ways, as more fully described below.

Panel 406 indicates which photos (or photo data associated with those photos) should be sent according to their tags. In this example, tags "Bob" and "Family" (i.e., "Sue" and "Mom") are selected. Accordingly, the contacts selected in panel 402 are associated with the tags selected in panel 406.

Panel 408 indicates filtering or other information. The user may select "send other photos" and select other photos to be sent in addition to those to be sent based on the selections in panel 406. The user may select "only send photos not already sent to this contact" so that the contact "Mom" only receives the latest photos of "Bob," "Sue," and "Mom" and not photos that she has previously received. In some embodiments, one or more of the options in panels 404-408 and/or other options may be designated for each contact in panel 402 (email address, postal address, telephone, and other).

Tags may be associated with contacts in various other ways. In some embodiments, a user may move a mouse pointer over a tag in panel 106, bring up a right click menu, and select "Edit Contact" from the menu, which opens an interface for associating one or more contacts with the selected tag. In this way, a new association may be added. If interface 300 is subsequently opened, table 300 may be updated to include the new association.

Figure 5:
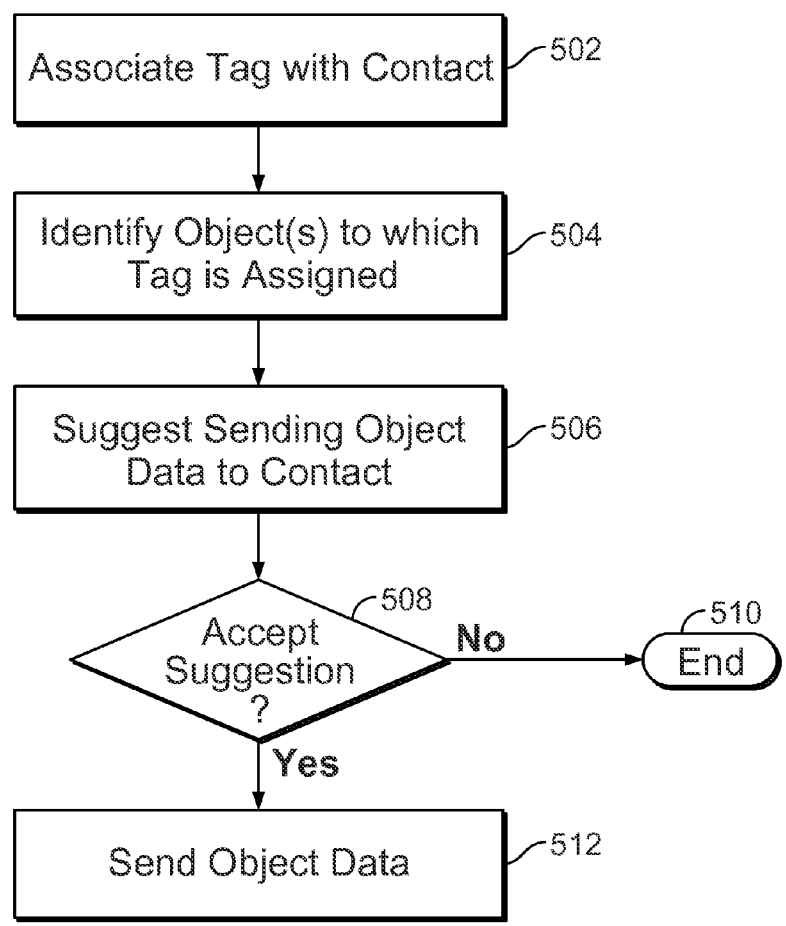
FIG. 5 is a flowchart illustrating an embodiment of a process for sharing object data.

FIG. 5 is a flowchart illustrating an embodiment of a process for sharing object data. In the example shown, associations between contacts and tags may be used to make suggestions regarding sending object data. At 502, a tag is associated with a contact. For example, a user may associate a tag with a contact by selecting an appropriate menu item from a right click submenu on the tag in panel 106 and entering the contact in a resulting dialog window. Alternatively, a user may associate a tag with a contact using an interface such as photo sharing interface 300 and/or sharing settings interface 400. For example, the tag "bob" is associated with the contact "bob@bob_smith.com." At 504, object(s) to which the tag is assigned are identified. As described above, an object may include a file, folder, bookmark, etc. In one example, all photos tagged "bob" are identified. At 506, it is suggested that object data be sent to the contact. For example, a dialog window may open that asks the user whether to send photos tagged "bob" to a contact associated with the tag "bob". The suggestion may be in response to the user performing an action, such as tagging a face "bob." At 508, it is determined whether the suggestion is accepted. If the suggestion is not accepted, the process ends at 510. If the suggestion is accepted, object data is sent at 512. The object data may include any data associated with the object, such as a reference (e.g., a URL or bookmark) to an entity (e.g., network, device, server, or other sharing platform) via which the object is accessible, a transformed object (e.g., compressed images or images that are reduced in size), or a copy of the object. For example, copies of photos tagged "bob" are sent to "bob@bob_smith.com."

In some embodiments, steps 506-510 are optional. In some embodiments, when object(s) are tagged, object data is automatically sent. In some embodiments, sending object data at 512 is triggered by a manual indication. A user can manually indicate that the object data should be sent, for example, by opening interface 300 and selecting send button 310.

Figure 6:
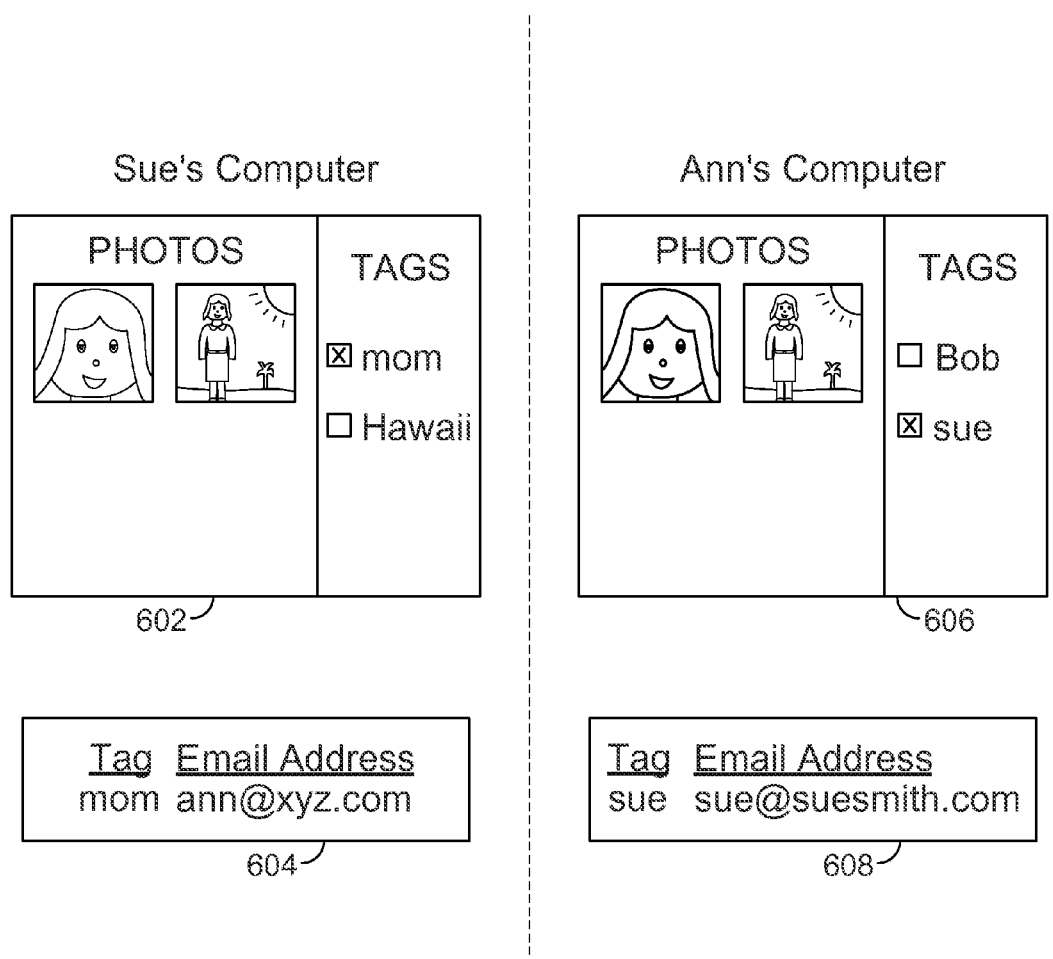
FIG. 6 is a diagram illustrating an example of using an association between a tag and a contact to suggest a tag.

FIG. 6 is a diagram illustrating an example of using an association between a tag and a contact to suggest a tag. In this example, Sue sends a set of photos to her mother, Ann. Sue's computer 602 includes two photos tagged "Mom" and an association 604 between the tag "mom" and contact "ann@xyz.com." Sue sends the photos from "sue@suesmith.com" to her mother at "ann@xyz.com." Sue's photos do not need to be tagged and she does not need to have association 604. Sue may manually send the photos by dragging and dropping them into an email message.

Ann receives the photos sent by Sue. Ann's computer 606 includes the two photos and an association 608 between the tag "sue" and the contact "sue@suesmith.com." Ann's computer recognizes that the two received photos were sent by "sue@suesmith.com" and suggests that the two new photos be tagged "sue" based on association 608. For example, a dialog window may open upon receipt of the two photos. The dialog window may state "These photos came from a contact associated with the tag 'sue'. Tag these photos 'sue'?" In response, Ann accepts_the suggestion and the photos are tagged "sue." This provides a convenient way for Ann to tag photos that are received from Sue. In some embodiments, rather than suggesting that the photos be tagged "sue," other tags such as "from sue" may be suggested.

Figure 7:
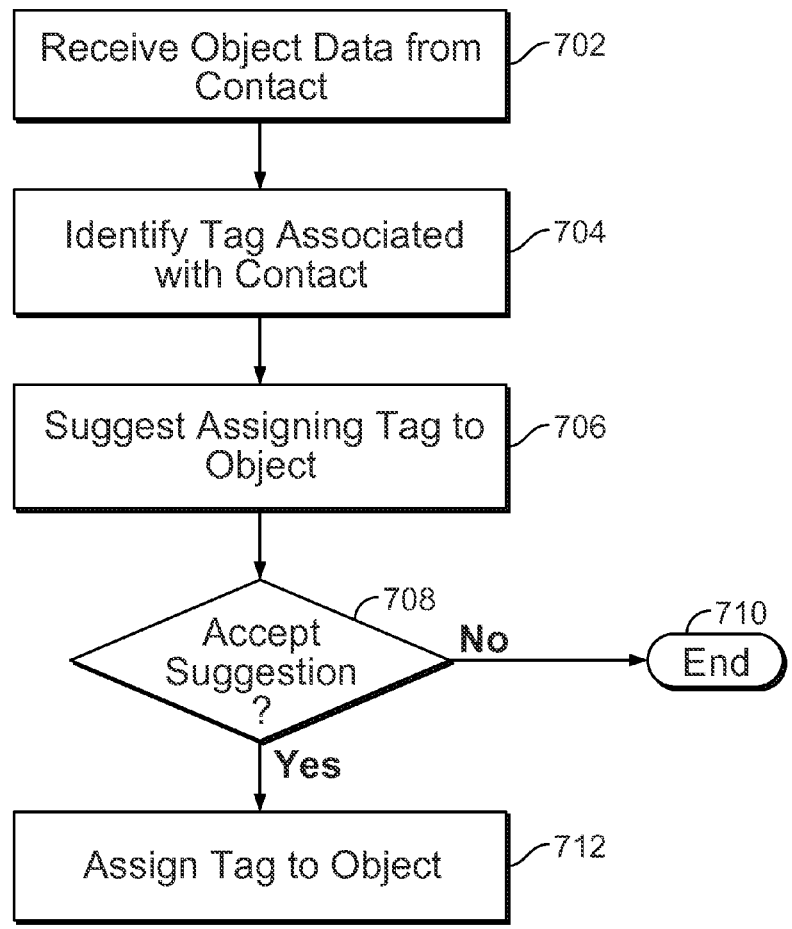
FIG. 7 is a flowchart illustrating an embodiment of assigning a tag to a received object.

FIG. 7 is a flowchart illustrating an embodiment of assigning a tag to a received object. In the example shown, an assignment of a tag is suggested based on an association between one or more tags and one or more objects. At 702, object data is received from a contact. For example, a photo may be obtained from an email or downloaded from a website. At 704, a tag associated with the contact is identified. A table such as table 202 or table 302 may be consulted. For example, a photo is received from "bob_smith@bobsmith.com." From table 302, it is determined that "bob_smith@bobsmith.com" is associated with tag "bob." At 706, a suggestion is made to assign the tag to the object. In the above example, it is suggested that the received photo be tagged "bob." At 708, it is determined whether the suggestion is accepted. If it is not accepted, the process ends at 710. If it is accepted, the tag is assigned to the object. In some cases, a contact is associated with multiple tags, in which case multiple tags may be suggested. A user may accept none, some, or all of the suggested assignments of tags. In the above example, the tag "bob" is assigned to the received object.

In some embodiments, steps 706-710 are optional. In some embodiments, a tag is automatically assigned to an object based on an association. In some embodiments, the user indicates that a tag should be assigned based on an association. For example, the user may select a button to request that tags associated with a selected contact be assigned to appropriate objects. The tags may then be displayed and individually accepted or rejected, or automatically assigned.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, including:
   creating a data structure containing a plurality of tag to contact address mappings, wherein each mapping is specified by a sending user;
   receiving a tag for an object;
   looking up the tag in the data structure to determine which tag to contact address mapping is associated with the tag;
   identifying a contact address from the determined tag to contact address mapping;

identifying, as objects to share with the contact address, objects to which the tag is assigned, wherein identifying is performed by a processor;

using the determined tag to contact address mapping to automatically suggest, via a user interface, sharing with the contact address object data associated with the objects to share;

receiving an indication that the suggestion has been accepted; and in response to receiving the indication, sending object data associated with the objects to share to the contact address, based on the association between the tag and the contact addresses;

wherein the contact address is associated with a recipient system configured to receive object data sent to the contact address, and is further configured to use the sender's contact address to automatically identify a tag to which the sender's contact address maps based on a recipient user's contact address to tag mapping specified by the recipient user, wherein the recipient's contact address to tag mapping is different from the sending user's tag to contact address mappings, and to automatically suggest, to the recipient, the identified tag to assign to the object.

2. The method as recited in claim 1, wherein the contact address includes an email address, a postal address, a telephone number, or an instant messenger ID.

3. The method as recited in claim 1, wherein the object data includes a reference associated with the object.

4. The method as recited in claim 1, wherein the object data includes a URL.

5. The method as recited in claim 1, wherein the object data includes a copy of the object.

6. The method as recited in claim 1, wherein the object data includes a transformed object.

7. The method as recited in claim 1, wherein the objects include an image.

8. The method as recited in claim 1, wherein the objects include a subimage that includes face.

9. The method as recited in claim 1, wherein the objects include a file.

10. The method as recited in claim 1, wherein the objects include a URL.

11. The method as recited in claim 1, wherein the objects include a folder.

12. The method as recited in claim 1, wherein the objects include an album.

13. The method as recited in claim 1, wherein the objects include a folder and wherein the object data is associated with one or more items in the folder.

14. The method as recited in claim 1, wherein the objects include a folder and wherein one or more items in the folder are accessible using the object data.

15. The method as recited in claim 1, wherein the objects include a watched folder.

16. The method as recited in claim 1, wherein the objects include a face and the object data is associated with an image from which the face is detected.

17. The method as recited in claim 1, wherein sending includes sending object data associated with a subset of objects to which the tag is assigned.

18. The method as recited in claim 1, wherein the tag is associated with one or more contact addresses.

19. The method as recited in claim 1, wherein one or more tags is associated with the contact address.

20. The method as recited in claim 1, further including:

in response to receiving an indication that the suggestion has been accepted:

automatically providing a preview of the objects to share prior to sending the object data associated with the objects to share;

receiving a verification that the previewed objects are the objects desired to be shared by the sending user; and in response to receiving the verification and to receiving the indication, sending the object data associated with the objects to share to the contact address.

21. The method as recited in claim 1, wherein identifying as objects to share with the contact address includes identifying only objects that have not already been shared with the contact address.

22. A computer program product, the computer program product being embodied in a non-transitory computer readable storage medium and storing computer instructions and when the computer instructions are executed, performing the steps of:

creating a data structure containing a plurality of tag to contact address mappings, wherein each mapping is specified by a sending user;

receiving a tag for an object;

looking up the tag in the data structure to determine which tag to contact address mapping is associated with the tag;

identifying a contact address from the determined tag to contact address mapping;

identifying, as objects to share with the contact address, objects to which the tag is assigned, wherein identifying is performed by a processor;

using the determined tag to contact address mapping to automatically suggest, via a user interface, sharing with the contact address object data associated with the objects to share;

receiving an indication that the suggestion has been accepted; and in response to receiving the indication, sending object data associated with the objects to share to the contact address, based on the association between the tag and the contact addresses;

wherein the contact address is associated with a recipient system configured to receive object data sent to the contact address, and is further configured to use the sender's contact address to automatically identify a tag to which the sender's contact address maps based on a recipient user's contact address to tag mapping specified by the recipient user, wherein the recipient's contact address to tag mapping is different from the sending user's tag to contact address mappings, and to automatically suggest, to the recipient, the identified tag to assign to the object.

23. A system, including:

a processor; and a memory coupled with the processor, wherein the memory is configured to provide the processor with instructions which when executed cause the processor to:

create a data structure containing a plurality of tag to contact address mappings, wherein each mapping is specified by a sending user;

receive a tag for an object;

look up the tag in the data structure to determine which tag to contact address mapping is associated with the tag;

identify a contact address from the determined tag to contact address mapping;

identify, as objects to share with the contact address, objects to which the tag is assigned, wherein identifying is performed by a processor;

use the determined tag to contact address mapping to automatically suggest, via a user interface, sharing with the contact address object data associated with the objects to share;

receive an indication that the suggestion has been accepted; and in response to receiving the indication, send object data associated with the objects to share to the contact address, based on the association between the tag and the contact addresses;

wherein the contact address is associated with a recipient system configured to receive object data sent to the contact address, and is further configured to use the sender's contact address to automatically identify a tag to which the sender's contact address maps based on a recipient user's contact address to tag mapping specified by the recipient user, wherein the recipient's contact address to tag mapping is different from the sending user's tag to contact address mappings, and to automatically suggest, to the recipient, the identified tag to assign to the object.

24. A method, including:

creating a data structure containing a plurality of contact address to tag mappings, wherein each mapping is specified by a recipient user;

receiving an object;

identifying a contact address from which the object was received, wherein identifying is performed by a processor;

accessing the data structure of contact address to tag mappings;

looking up the contact address in the data structure to determine which contact address to tag mapping is associated with the contact address;

identifying a tag from the determined contact address to tag mapping;

using the determined contact address to tag mapping to automatically suggest assigning the identified tag to the object based on the data structure lookup;

receiving an indication that the suggestion has been accepted; and in response to receiving the indication, assigning the tag to the object;

wherein the contact address is associated with a sending system configured to send objects to the recipient, and is further configured to automatically suggest an object to be sent to the recipient's contact address based on the sending user's tag to contact address mapping specified by the sending user, wherein the sending user's tag to contact address mapping is different from the recipient user's contact address to tag mappings.

25. The method as recited in claim 24, wherein the contact address includes an email address, a postal address, a telephone number, or an instant messenger ID.

26. The method as recited in claim 24, wherein the object includes an image.

27. The method as recited in claim 24, wherein receiving the object includes receiving object data associated with the object and obtaining the object using the object data.

28. The method as recited in claim 24, wherein receiving the object includes receiving a URL and obtaining the object using the URL.

29. A computer program product, the computer program product being embodied in a non-transitory computer readable storage medium and storing computer instructions and when the computer instructions are executed, performing the steps of:

creating a data structure containing a plurality of contact address to tag mappings, wherein each mapping is specified by a recipient user;

receiving an object;

identifying a contact address from which the object was received, wherein identifying is performed by a processor;

accessing the data structure of contact address to tag mappings;

looking up the contact address in the data structure to determine which contact address to tag mapping is associated with the contact address;

identifying a tag from the determined contact address to tag mapping;

using the determined contact address to tag mapping to automatically suggest assigning the identified tag to the object based on the data structure lookup;

receiving an indication that the suggestion has been accepted; and in response to receiving the indication, assigning the tag to the object;

wherein the contact address is associated with a sending system configured to send objects to the recipient, and is further configured to automatically suggest an object to be sent to the recipient's contact address based on the sending user's tag to contact address mapping specified by the sending user, wherein the sending user's tag to contact address mapping is different from the recipient user's contact address to tag mappings.

30. A system, including:

a processor; and a memory coupled with the processor, wherein the memory is configured to provide the processor with instructions which when executed cause the processor to:

create a data structure containing a plurality of contact address to tag mappings, wherein each mapping is specified by a recipient user;

receive an object;

identify a contact address from which the object was received, wherein identifying is performed by a processor;

access the data structure of contact address to tag mappings;

look up the contact address in the data structure to determine which contact address to tag mapping is associated with the contact address;

identify a tag from the determined contact address to tag mapping;

use the determined contact address to tag mapping to automatically suggest assigning the identified tag to the object based on the data structure lookup;

receive an indication that the suggestion has been accepted; and in response to receiving the indication, assign the tag to the object;

wherein the contact address is associated with a sending system configured to send objects to the recipient, and is further configured to automatically suggest an object to be sent to the recipient's contact address based on the sending user's tag to contact address mapping specified by the sending user, wherein the sending user's tag to contact address mapping is different from the recipient user's contact address to tag mappings.

* * * * *